April 2, 1935.  F. W. KOSTER  1,996,706
ACETIC ACID RECOVERY
Filed Nov. 22, 1933
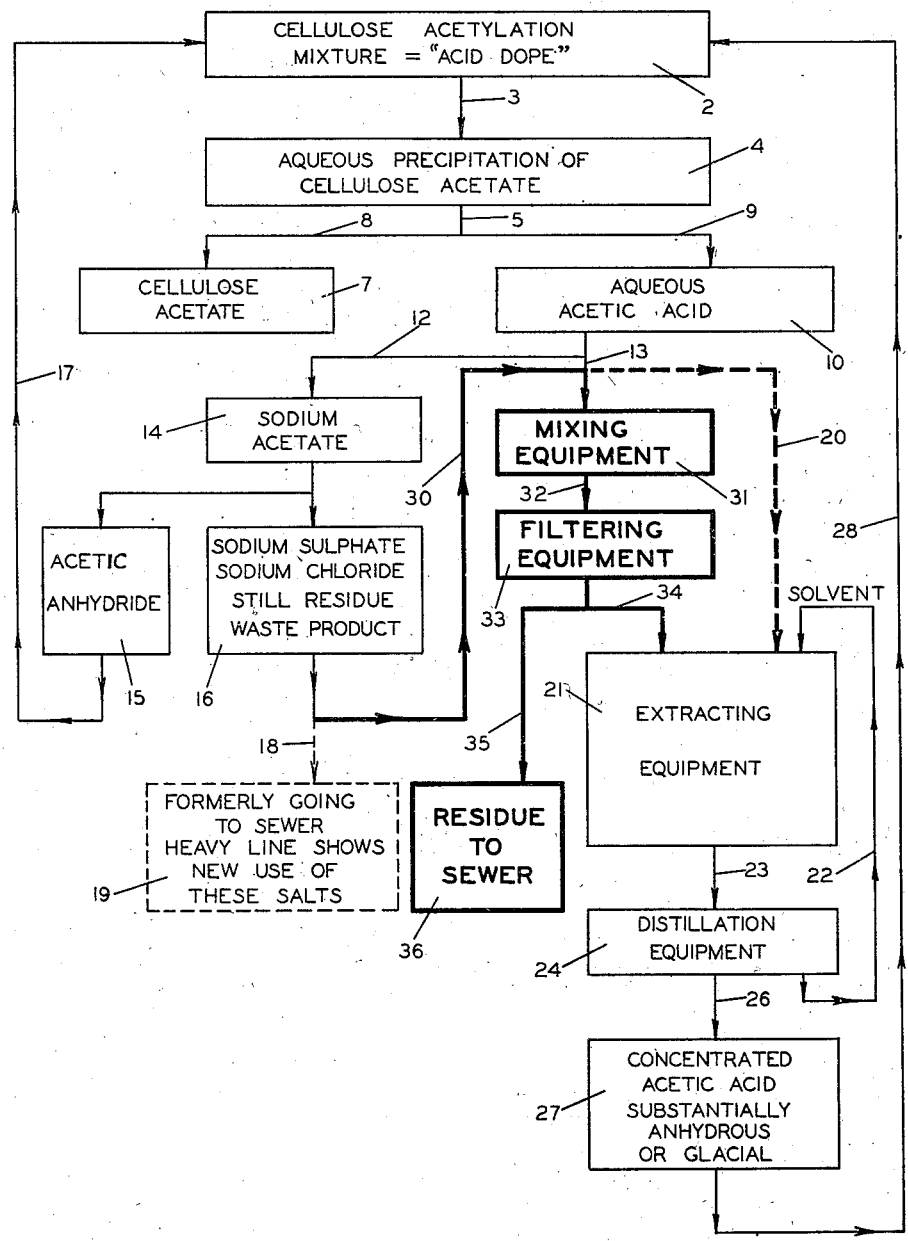
INVENTOR
FREDERICK W. KOSTER
BY HIS ATTORNEYS
*Howson and Howson*

Patented Apr. 2, 1935

1,996,706

UNITED STATES PATENT OFFICE 1,996,706

ACETIC ACID RECOVERY

Frederick W. Koster, Meadville, Pa., assignor to The Viscose Company, Marcus Hook, Pa., a corporation of Pennsylvania Application November 22, 1933, Serial No. 699,251

10 Claims. (Cl. 260—122)

This invention relates to the recovery of concentrated acetic acid from dilute aqueous solutions thereof, for example the weak acetic acid obtained as a by-product in the manufacture of cellulose acetate, and more particularly to methods of this character which comprise extracting the acid by means of an organic solvent which is practically immiscible with the aqueous solution, separating the solvent-acid extract from the aqueous extracted solution by decantation, and finally separating the solvent from the acid by distillation. It is the main object of this invention to improve the efficiency and the economy of the extraction step, along with other objects which may hereinafter appear.

One of the chief problems in this process is the difficulty of selecting a proper solvent, particularly when the production of an anhydrous acid is desired. Most of the more volatile organic solvents that have a high distribution ratio for the acid as between solvent and aqueous solution, have the undesirable property of also extracting from the dilute acid solution, a prohibitive amount of water.

As this water must be subsequently removed if anhydrous acid is to be obtained, the use of such solvents as ethyl ether and ethyl acetate is uneconomical, although otherwise highly desirable as to partition coefficients of distribution. The acid resulting from ethyl ether extraction is never higher than 75%, while ethyl acetate is similar, and has the further disadvantage that with higher concentrations of acetic acid such as 35% and 40%, it is miscible and therefore cannot be decanted from them.

It has been proposed to treat the solvent-acid extract with deliquescent salts which will absorb water from the solution and thus leave a more concentrated acid in the solvent. This method is expensive and not practical when dealing with large quantities of low priced acids.

It has also been proposed to employ a mixture of extracting solvents to reduce the quantity of water which is extracted with the acid. Volatile hydrocarbons like benzene or petroleum ether, and chlorinated hydrocarbons and other compounds, all yield a highly concentrated acid, but their coefficients of distribution are very poor. If these are mixed with solvents having high distribution coefficients, the quantity of water extracted by the mixed solvent is reduced; but at the same time the distribution coefficient is likewise reduced. Hence the efficiency of the solvent mixture as an extracting medium is lowered accordingly. With this solvent mixture proposal therefore, it is necessary to balance the advantages gained by obtaining a concentrated acid from the extraction, against the cost of removing the extra volume of solvent required by the lowered distribution coefficient and consequent lowered extraction efficiency.

A further proposal is the addition to the aqueous acetic acid solution, of salts which are insoluble in the extracting solvent. Thus the distribution coefficient is increased, in amount depending on the degree of saturation of the solution with the salts. Hence to obtain exhaustion of the acid in the aqueous solution by the extraction process, smaller volumes of solvent are required, and smaller quantities of water are extracted with the acid. It is possible in this manner to use solvents of very high extraction efficiencies, for example ethyl ether or ethyl acetate, for the production of highly concentrated or even anhydrous acetic acid. However, the cost of such salts in amount required for producing even partial saturation of the weak acetic acid is prohibitive, when the low market value of glacial acetic acid is considered, and is the chief obstacle to the industrial application of this proposal.

It has been discovered, however, that the advantages of this third proposal may be obtained without the prohibitive cost, by employing inexpensive or waste salts such as sodium sulphate and sodium chloride. In the manufacture of acetic anhydride, one of the operations associated with the production of cellulose acetate, there is obtained as waste material a mixture of sodium chloride and sodium sulphate which is especially adapted to carrying out the above suggested method. These salts are anhydrous, and usually contain appreciable amounts of acetic acid values which will be recovered automatically in the extraction operation.

The drawing is a flow sheet of the manufacture of cellulose acetate as improved by the present invention.

The acid dope or cellulose acetylation mixture 2 comprises cellulose acetate in solution in acetic acid. This material is passed by any suitable means 3 such as a pipe or conveyor, to the precipitation stage 4 wherein the cellulose acetate is precipitated by contact with water.

The products from the precipitation stage 4 are removed at 5, and the cellulose acetate precipitate 7 is separated at 8 from the aqueous acetic acid 10 by decantation 9. This cellulose acetate 7 is a primary product, which is washed and ground if necessary for further processing, incidental to the manufacture of cellulose acetate products, such as rayon.

The aqueous acetic acid 10 is the product which is to be concentrated, for example, to be returned to the cellulose acetylation mixture 2. This aqueous acetic acid is divided into two parts or streams 12 and 13. The part 12 is treated to recover sodium acetate 14. Acetic anhydride 15 is produced from this sodium acetate 14, and it is returned by 17 to the cellulose acetylation stage 2. This acetic anhydride production leaves a still residue 16 of sodium sulphate and sodium chloride, which was formerly a waste product, to be passed for example by 18 to the sewer 19.

The remaining part 13 of the aqueous acetic acid was formerly passed, as shown by the dotted line 20, directly to extracting equipment 21.

In the extracting equipment 21, the solvent for example ethyl ether, amyl acetate and/or ethyl acetate, the last being preferred, is introduced as at 22, preferably in counterflow relation. The solvent-acid-extract is decanted as at 23 and passed to distillation equipment 24, where the solvent is distilled from the acid extract, and condensed and returned by 22 to the extraction stage 21, leaving at 26 a residue of concentrated acetic acid 27 which, in substantially anhydrous or glacial form, is returned by 28 to the cellulose acetylation stage 2.

According to one embodiment of the present invention, as shown by the heavy lines, the still residue 16 is passed by 30 to the stream 13 of aqueous acetic acid 10, going to the mixing equipment 31. From this stage the mixture of salts 16 and acid 10 pass by 32 to filtering equipment 33. The filtrate passes by 34 to the extraction stage 21, while the residue is disposed of by 35, which passes this residue to the sewer 36.

The quantity of water in the extract will depend on the degree to which the aqueous acid is saturated with these salts, the amount of water extracted decreasing with the quantity of salts dissolved. For example, with a 25% acetic acid solution and ethyl ether as an extracting medium, the extracted acid is usually between 70% and 75% in concentration, after removal of the ether. By the addition of 15% of waste salts to the 25% acid solution, the strength of the ether free extracted acid can be raised to 85%. Further increases in the salts addition result in even stronger acids.

In the case of ethyl acetate, which has one of the highest distribution coefficients for acetic acid as between solvent and water, it is possible to obtain practically anhydrous acid by the addition of 15% of these salts to the dilute acid before extraction. In fact it is only possible by such additions to use this most desirable solvent by itself, because as pointed out above, there is no separation between it and aqueous acids above 20% in concentration. Such a small amount of water is extracted by this procedure with ethyl acetate, that it is all carried over as a minimum boiling point mixture with the ethyl acetate, as the latter is separated from the acid by distillation. The result is an anhydrous residue of acid.

Since the acetic anhydride cannot in practical operation be completely distilled from the still residues, there was formerly an appreciable loss of this product when the residues were discharged to the sewer. By dissolving the residues in the aqueous acetic acid as proposed this anhydride is converted to acetic acid and is recovered as such during the extraction.

An incidental further advantage of this invention is the salting out effect produced by the addition of inorganic salts on the dissolved organic impurities in the dilute acid, the presence of which might otherwise interfere with the extraction or the quality of the acid recovered.

It is to be understood that the invention embraces such embodiments of the broad idea as fall within the scope of the appended claims.

I claim:

1. In the manufacture of cellulose acetate in which dilute aqueous acetic acid is produced and concentrated by extraction, and in which acetic anhydride is produced from part of said dilute aqueous acetic acid leaving a residue of waste salts, the improvement which comprises dissolving about 15% waste salts from said residue in said dilute aqueous acetic acid solution before the extraction step.

2. In the process of manufacture of cellulose acetate which comprises acetylating cellulose to form acid dope, precipitating cellulose acetate from said acid dope by contacting the acid dope with water, whereby cellulose acetate and aqueous acetic acid are formed, decanting the aqueous acetic acid from the cellulose acetate, treating a part of said aqueous acetic acid to recover sodium acetate, producing acetic anhydride from the sodium acetate leaving a residue of waste salts, subjecting the other part of the aqueous acetic acid solution to extraction with a solvent, decanting the solvent acid layer and distilling off the solvent from the concentrated acetic acid, and returning the concentrated acetic acid to the acetylation stage, the improvement which comprises dissolving a substantial quantity of waste salts from said residue in said other part of the aqueous acetic acid solution.

3. Process of recovering concentrated acetic acid from a dilute aqueous solution thereof produced in the manufacture of cellulose acetate, which comprises dissolving in the aqueous acetic acid solution a substantial quantity of waste salts which contain acetic acid values from another part of the cellulose acetate process, and subjecting the resulting solution to extraction with a solvent largely immiscible with water.

4. Process for the recovery of concentrated acetic acid from a dilute aqueous solution thereof which comprises adding to the solution at least 15% of waste salts from the manufacture of cellulose acetate and containing acetic acid values, and subjecting the solution to extraction with an organic solvent, decanting the solvent acid layer and distilling the solvent therefrom whereby the acetic acid is concentrated and the acetic acid values from said waste salts are recovered.

5. In the manufacture of cellulose acetate in which dilute acetic acid is produced, and waste salts remain from the production of acetic anhydride from part of said dilute acetic acid, and another part is concentrated by extraction, the improvement which comprises adding a substantial quantity of said waste salts to said other part of the dilute aqueous acetic acid before the extraction step.

6. In the manufacture of cellulose acetate, the improvement in the process for the concentration of acetic acid which comprises dissolving a substantial quantity of one or more waste salts produced elsewhere in the manufacture of the cellulose acetate and selected from the group consisting of sodium chloride and sodium sulphate and containing acetic acid values, in dilute aqueous acetic acid solution, and extracting concentrated acetic acid therefrom with a solvent largely immiscible with water.

7. Process of recovering concentrated acetic acid from waste salts produced in the manufacture of acetic anhydride which comprises dissolving in aqueous acetic acid a substantial quantity of said waste salts and subjecting the resulting solution to extraction with a solvent for acetic acid.

8. In the manufacture of cellulose acetate in which dilute aqueous acetic acid is produced and concentrated by extraction, and in which acetic anhydride is produced leaving a residue of waste salts containing acetic anhydride, the improvement which comprises recovering the acetic acid values in said waste salts by dissolving a substantial quantity of said waste salts in the dilute aqueous acetic acid before the extraction step.

9. The process of mutually increasing the economy of acetic acid extraction from dilute aqueous solution and the production of acetic anhydride which comprises dissolving a substantial quantity of the mixture of waste salts and unrecovered acid anhydride from the acetic anhydride manufacture in said dilute aqueous acetic acid before subjecting the latter to extraction.

10. Process of recovering concentrated acetic acid from the waste salts produced in the manufacture of acetic anhydride, which comprises dissolving in aqueous acetic acid a quantity of said waste salts, subjecting the solution to extraction with a solvent for acetic acid, said waste salts being in amount sufficient to produce acetic acid of from 75% to more than 85% concentration.

FREDERICK W. KOSTER.